US010642639B2

(12) United States Patent
Koehler et al.

(10) Patent No.: US 10,642,639 B2
(45) Date of Patent: May 5, 2020

(54) STATIC IP RETENTION FOR MULTI-HOMED VMS ON MIGRATION

(71) Applicant: NUTANIX, Inc., San Jose, CA (US)

(72) Inventors: Heiko Koehler, San Jose, CA (US); Sameer Narkhede, Sunnyvale, CA (US)

(73) Assignee: NUTANIX, INC., San Jose, CA (US)

( * ) Notice: Subject to any disclaimer, the term of this patent is extended or adjusted under 35 U.S.C. 154(b) by 289 days.

(21) Appl. No.: 15/883,518

(22) Filed: Jan. 30, 2018

(65) Prior Publication Data
US 2019/0235898 A1 Aug. 1, 2019

(51) Int. Cl.
G06F 9/455 (2018.01)
H04L 29/12 (2006.01)

(52) U.S. Cl.
CPC ...... *G06F 9/45558* (2013.01); *H04L 61/2007* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 8,549,518 | B1 | 10/2013 | Aron et al. | |
|---|---|---|---|---|
| 8,601,473 | B1 | 12/2013 | Aron et al. | |
| 8,713,139 | B1* | 4/2014 | Kasper | H04L 61/2038 709/221 |
| 8,850,130 | B1 | 9/2014 | Aron et al. | |
| 9,197,489 | B1* | 11/2015 | Vincent | H04L 67/148 |
| 9,772,866 | B1 | 9/2017 | Aron et al. | |
| 2015/0160964 | A1* | 6/2015 | Nelson | G06F 9/45558 718/1 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Wissam Rashid
(74) *Attorney, Agent, or Firm* — Foley & Lardner LLP

(57) ABSTRACT

An illustrative embodiment disclosed herein is a method, by a migration virtual machine, including determining whether a first target network interface card is configured by dynamic host configuration protocol and sending a first address resolution protocol request for a first source Internet Protocol gateway to the first target network interface card. Sending the first address resolution protocol request is based on determining that the first target network interface card is not configured by dynamic host configuration protocol. The method further includes determining whether the first target network interface card responds to the first address resolution protocol request of the migration virtual machine and applying an Internet Protocol configuration of a first source network interface card to the first target network interface card. Applying the Internet Protocol configuration is based on receiving a response from the first target network interface card to the first address resolution protocol request of the migration virtual machine.

21 Claims, 6 Drawing Sheets

(56) References Cited

U.S. PATENT DOCUMENTS

2015/0324217 A1    11/2015    Shilmover et al.

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/m
Poitras, Steven. "The Nutanix Bible" (Jan. 3, 2018), from https://nutanixbible.com/.
Cano, Ignacio, et al. "Curator: Self-Managing Storage for Enterprise Clusters" (Mar. 27, 2017), from https://www.usenix.org/conference/nsdi17/.

\* cited by examiner

STATIC IP RETENTION FOR MULTI-HOMED VMS ON MIGRATION

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY OF PARTICULAR EMBODIMENTS

Aspects of the present disclosure relate generally to a virtualization environment, and more particularly to a method of static IP retention during a virtual machine migration across different hardware platforms. One technical advantage of the foregoing technical solution is that services running on the migrating VM will have imperceptible downtime during migration. Another technical solution is the physical resources and the network bandwidth allocation will not be negatively affected by the migration.

An illustrative embodiment disclosed herein is a method, by a migration virtual machine, including determining whether a first target network interface card is configured by dynamic host configuration protocol and sending a first address resolution protocol request for a first source Internet Protocol gateway to the first target network interface card. Sending the first address resolution protocol request is based on determining that the first target network interface card is not configured by dynamic host configuration protocol. The method further includes determining whether the first target network interface card responds to the first address resolution protocol request of the migration virtual machine and applying an Internet Protocol configuration of a first source network interface card to the first target network interface card. Applying the Internet Protocol configuration is based on receiving a response from the first target network interface card to the first address resolution protocol request of the migration virtual machine within a first time period.

Another illustrative embodiment disclosed herein is a system a source host comprising a first source interface card, a target host comprising a first target interface card, and a migration virtual machine that is coupled to the source host and the target host. The migration virtual machine is configured to determine whether a first target network interface card is configured by dynamic host configuration protocol and send a first address resolution protocol request for a first source Internet Protocol gateway to the first target network interface card. Sending the first address resolution protocol request is based on determining that the first target network interface card is not configured by dynamic host configuration protocol. The migration virtual machine is further configured to determine whether the first target network interface card responds to the first address resolution protocol request of the migration virtual machine and apply an Internet Protocol configuration of a first source network interface card to the first target network interface card. Applying the Internet Protocol configuration is based on receiving a response from the first target network interface card to the first address resolution protocol request of the migration virtual machine within a first time period.

Another illustrative embodiment disclosed herein is a non-transitory computer-readable storage medium having instructions stored thereon that, upon execution by a computing device, causes the computing device to perform operations including determining whether a first target network interface card is configured by dynamic host configuration protocol and sending a first address resolution protocol request for a first source Internet Protocol gateway to the first target network interface card. Sending the first address resolution protocol request is based on determining that the first target network interface card is not configured by dynamic host configuration protocol. The method further includes determining whether the first target network interface card responds to the first address resolution protocol request of the migration virtual machine and applying an Internet Protocol configuration of a first source network interface card to the first target network interface card. Applying the Internet Protocol configuration is based on receiving a response from the first target network interface card to the first address resolution protocol request of the migration virtual machine within a first time period.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1A:
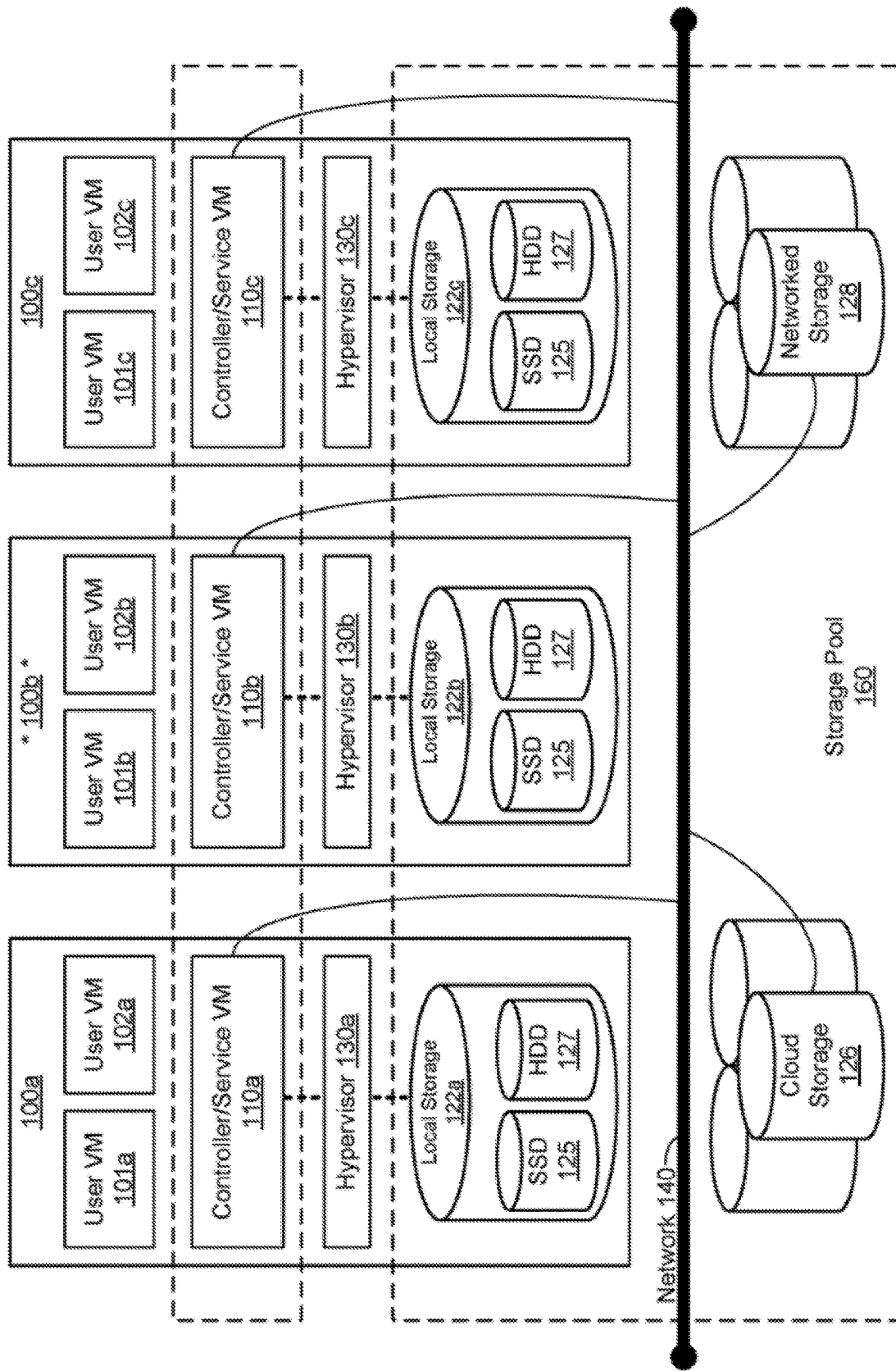
FIG. 1A illustrates a hyperconverged clustered virtualization environment according to some illustrative embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DESCRIPTION OF EXAMPLE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A host machine on which virtual machines (VMs) are running typically includes a hypervisor and physical devices such as at least one physical network interface card (NIC). The hypervisor partitions the physical devices, such as the physical NIC, into discrete virtual devices, such as a virtual NIC (VNIC), that run on each of the VMs on the host machine. Each VNIC shares a same subnet as the physical NIC that the VNIC is partitioned from. Other VMs communicate to the VM, in part, by identifying the Internet Protocol (IP) address of the VNIC residing on the VM. When the VM migrates from a source host to a target host, the static IP address of the VNIC needs to be retained on the target host, so that other VMs may still communicate with that VM. As a corollary, the subnet of the physical NIC on the target host has to be same as the subnet of the physical NIC on the source host. In conventional embodiments, VM migration and static IP retention where there are multiple physical NICs on the target machine and multiple physical NICs on the source machine is automatically performed by hypervisors running on each of the hosts. In such embodiments, the static IP is retained because the hardware configuration in a source hardware platform and a target hardware platform are same. For example, a first physical NIC on a first subnet on the source machine and a second NIC on the first subnet on the target machine are from the same vendor, of the same type, and connect to the same PCI slot number.

However, when migrating across different hypervisor vendors, the source hardware platform that the VM is migrating from is different from the target hardware platform that the VM is migrating to. Hardware identifies such as the vendor, the type, and the PCI slot numbers of the physical NICs are different between the two platforms. In the conventional embodiments where there are multiple physical NICs on the target machine, multiple physical NICs on the source machine, and the hardware identifiers between the two platforms are different, the VNIC of the VM will not automatically retain its static IP after the VM migrates to the target hardware platform. Without the VNIC retaining its static IP, the VM using the VNIC is inoperable because it is no longer reachable via network, thus reducing the number of operable VMs in the virtual environment. Services running on the VM will be disrupted and prolonged service downtime will depend on finding other VMs to run the services. The disrupted services will be temporarily or permanently inoperable. The inoperable services will not use available hardware resources such as CPU, storage, and network during time of inoperability. Due to a lack of VMs, a queue for running requested services may build up. Accordingly, a technical problem exists where the virtual environment is not appropriately allocating physical resources of a machine such as CPU and memory. Furthermore, VNICs of the inoperable VMs are assigned a portion of the bandwidth of the physical NICs. Thus, another technical problem exists that the network bandwidth allocated to the VNICs of the inoperable VMs is wasted.

The disclosure is directed to a static IP retention method of mapping, by a migration VM, multiple physical NICs on source host to multiple physical NICs on target host through dynamic host configuration protocol and probing, such that the subnet of each physical NIC on the source host matches the subnet of the physical NIC on the target host that its mapped to. Once the physical NICs are mapped, each of the VNICs are able to retain their static IPs. One technical advantage of the foregoing technical solution is that services running on the migrating VM will have imperceptible downtime during migration. Another technical solution is the physical resources and the network bandwidth allocation will not be negatively affected by the migration.

In general, a migration virtual machine is configured to static IP retention by mapping the physical NICs of the source host to the physical NICs of the target host with the same subnet and applying the IP configuration of the source NICs to the target NICs. The challenge is getting the subnet of the NIC of the target host. This is done in two ways. If the NIC on the target host is configured by dynamic host configuration protocol (DHCP), the migration virtual machine gets a subnet mask of the NIC target host subnet from its dynamic IP configuration file. A matching subnet mask between the source host and the target host indicate that the source host and the target host are on the same subnets. If the NIC on the target host is not configured by DHCP, the migration virtual machine probes the NIC on the target host for a source IP gateway. If the NIC on the target host responds, then the two have the same IP gateway, meaning they are on the same subnet.

Virtualization Technology and Environment

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

FIG. 1A illustrates a hyperconverged clustered virtualization environment according to particular embodiments. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122a-c that is within or directly attached to the server and/or appliance to be managed as part of storage pool 160. Examples of such storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM (CVM) 110 to be used by a user VM. In some embodiments, the vDisk is exposed via iSCSI ("internet small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 100, and work together to form a distributed system 110 that manages all the storage resources, including local storage 122, networked storage 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 100b, as indicated by the asterisks, may be a leader node. A leader node may have a software component designated to perform operations of the leader. For example, CVM 110b on host machine 100b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 101a-c and 102a-c. These disks are virtual, since they are implemented by the software running inside CVMs 110a-c. Thus, to user VMs 101a-c and 102a-c, CVMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
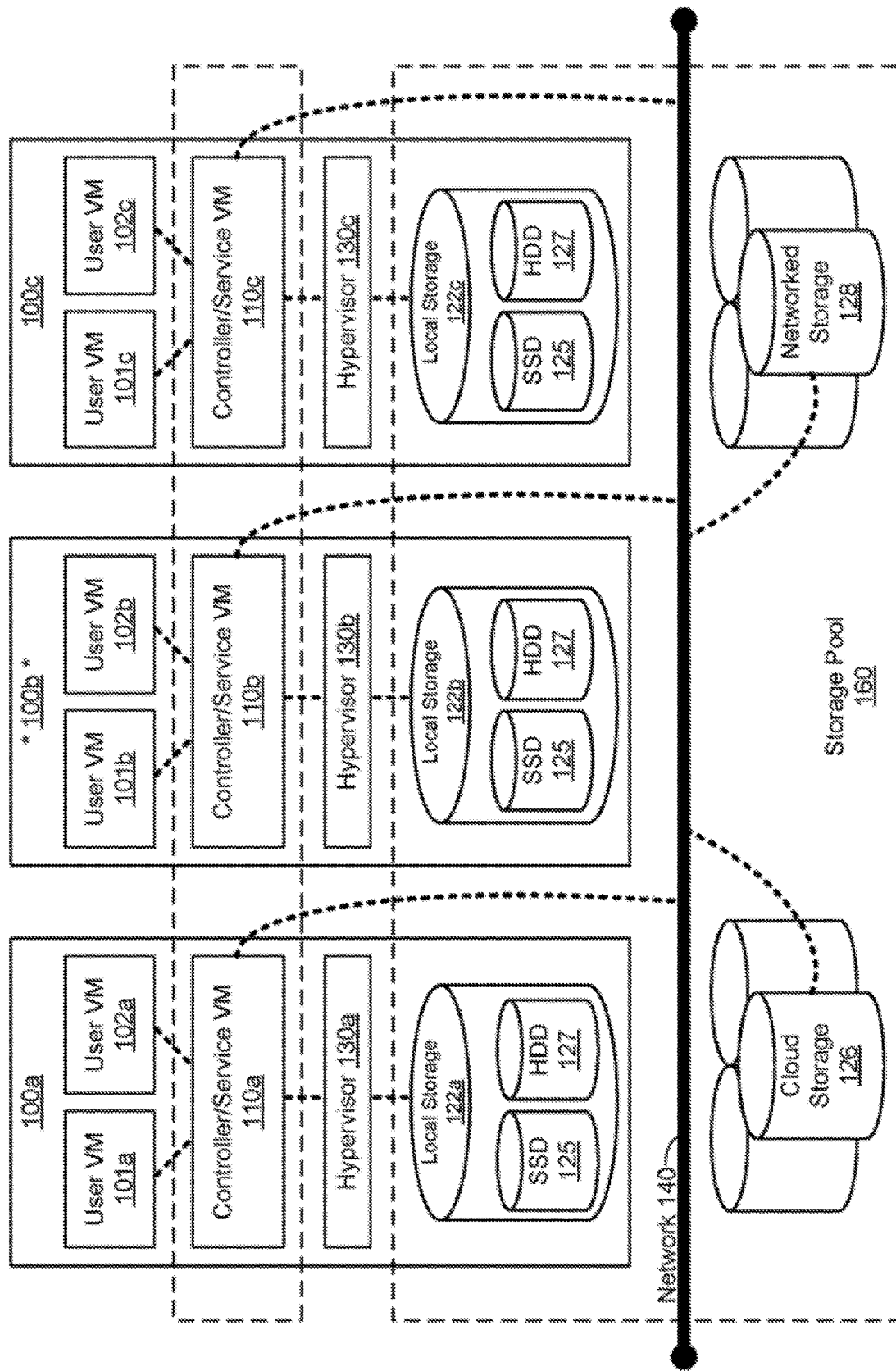
FIG. 1B illustrates data flow within a hyperconverged clustered virtualization environment according to some illustrative embodiments.

FIG. 1B illustrates data flow within an example hyperconverged clustered virtualization environment according to particular embodiments. As described above, one or more user VMs and a CVM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 100a, by connecting via network 140 to cloud storage 126 or networked storage 128, or by connecting via network 140 to local storage 122b-c within another host machine 100b-c (e.g., via connecting to another CVM 110b or 110c). In particular embodiments, any suitable computing system 300 may be used to implement a host machine 100.

Virtual Machine Static IP Retention Environment

Figure 2:
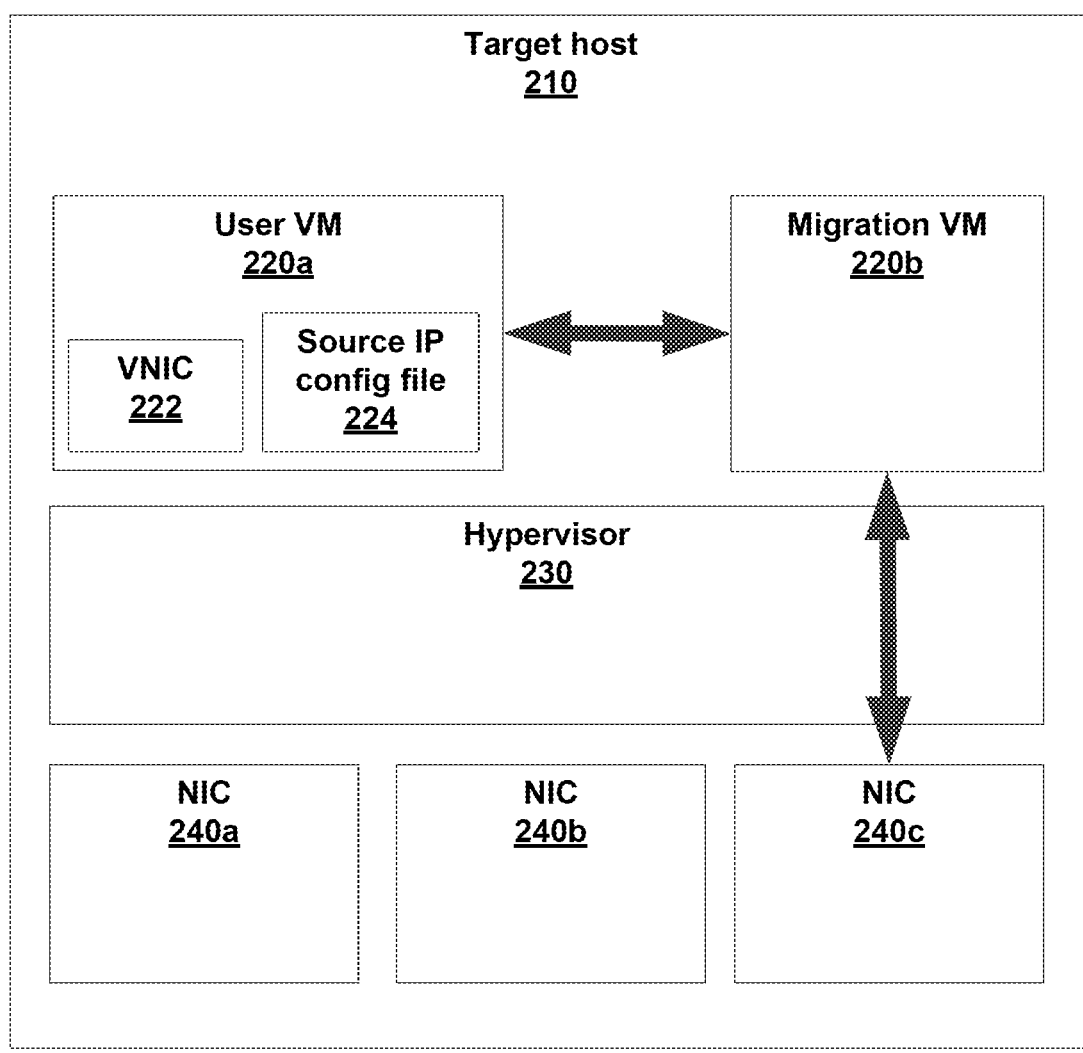
FIG. 2 illustrates an example embodiment of a virtual machine static IP retention environment.

FIG. 2 illustrates an example embodiment of a VM static IP retention environment 200. The virtual machine static IP retention environment 200 includes a target host 210. In some embodiments, the target host 210 is implemented as one of the nodes 100a-c in FIG. 1A. The target host 210 includes a user VM 220a which has migrated from a source host (not shown), a migration VM 220b, a hypervisor 230, and physical NICs 240a-c. In some embodiments, the user VM 220a is implemented as one of the user VMs 101a-c in FIG. 1A. In some embodiments, the hypervisor 230 is implemented as one of the hypervisors 130a-c in FIG. 1A.

The user VM 220a includes a VNIC 222 and a source IP config file 224. The source IP config file 224 includes IP configurations of the physical NICs on the source host. The source IP config file 224 is generated while user VM is on the source host. In some embodiments, multiple user VMs 220a migrate. In some embodiments, the source IP config file 224 is stored in virtual memory of user VM 220a. In some embodiments, the source IP config file 224 is stored in virtual memory of migration VM 220b. In some embodiments, the source IP config file 224 is stored in the storage pool 160 of FIG. 1A.

The migration VM 220b is coupled to the user VM 220a and the NICs 240a-c via the hypervisor 230. The migration VM is configured to manage mapping of each physical NIC on the source host to a physical NIC of the physical NICs 240a-c, such that each of the physical NIC on the host has a same subnet as the physical NIC on the target that it is mapped to. In some embodiments, the migration VM 220b is implemented as one of the user VMs 101a-c of FIG. 1A. In other embodiments, the migration VM 220b is implemented as one of the controller/service VMs 110a-c of FIG. 1A. In some embodiments, the migration VM 220b is on the target host 210. In other embodiments, the migration VM 220b is on a source host. In yet other embodiments, the migration VM 220b is on a different host than the target host 210 and the source host. In some embodiments, static IP retention operations of the migration VM 220b may be installed as a software program on the user VM 220a and executed to perform the static IP retention operations.

In some embodiments, a first hypervisor vendor corresponding to a hypervisor of the source host may be different from a second hypervisor vendor corresponding to the hypervisor 230 of target host 210. In some embodiments, the source host has a different first hardware platform than a second hardware platform of the target host 210. In some embodiments, the NICs 240a-c may be of a different type than NICs on the source host. In other embodiments, the NIC 240a-c may be of a different vendor than the vendor of the NICs on the source host. In yet other embodiments, the NICs 240a-c may be connected to a different PCI slot number than the corresponding NICs of the source host are connected to. A term for the physical NICs 240a-c is "NIC," a term for the physical NICs 240a-c on the source host is "source NIC," and a term for the physical NIC 240a-c on the target host 210 is "target NIC."

Figure 3:
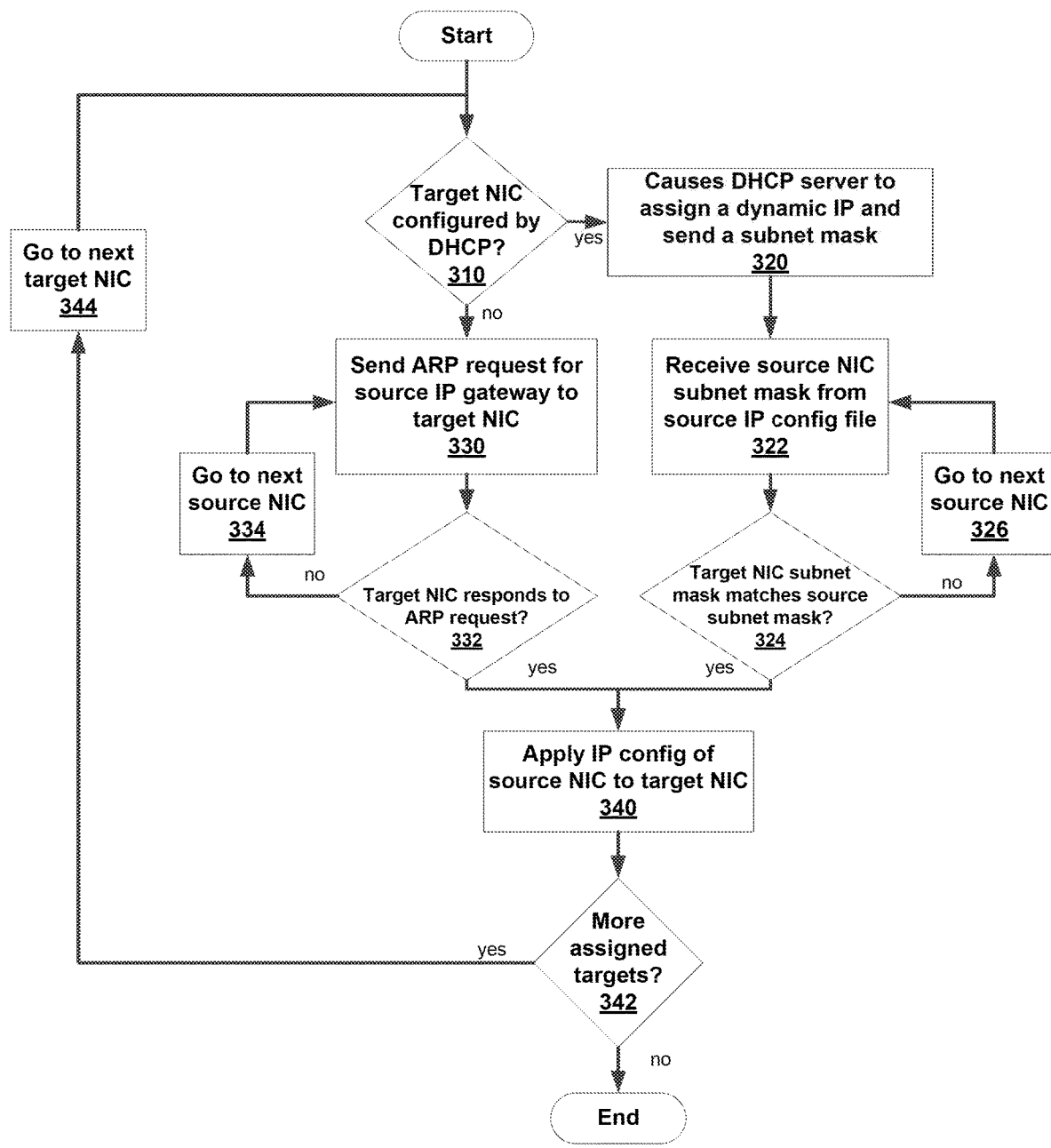
FIG. 3 illustrates an example method and flowchart of mapping, by a migration virtual machine, multiple physical NICs on source host to multiple physical NICs on target host during a virtual machine migration across different hardware platforms according to some illustrative embodiments.

FIG. 3 illustrates an example method and flowchart of mapping, by a migration virtual machine, multiple physical NICs on source host to multiple physical NICs on target host during a virtual machine migration across different hardware platforms. Additional, fewer, or different operations may be performed depending on the implementation. At operation 310, the migration VM 220b determines whether the target NIC is configured by DHCP. If the target is configured by DHCP, then, at operation 320, in response to the target NIC being configured by DHCP, the migration VM 220b causes a DHCP server to assign a dynamic IP configuration to the target NIC, including an IP address, a subnet mask, an IP gateway, and a DNS server address. At operation 320, the migration VM 220b also causes the DHCP server to send the target NIC's subnet mask to the migration VM 220b. At operation 322, the migration VM 220b fetches a source NIC's subnet mask from an IP configuration file that resides in a storage pool. For example, the IP configuration file may reside in local storage 122a, SSD 125, HDD 127, cloud storage 126, or networked storage 128. At operation 324, the migration VM compares the subnet mask of the target NIC to the subnet mask of the source NIC to see if the two subnets ID match. If they don't match, then at operation 326, the migration VM 220b goes to the next source NIC and repeats operation 322. If they do match, then at operation 340, the migration VM 220b applies an IP configuration of the source NIC to the target NIC. The IP configuration comprises an IP address, a subnet mask, an IP gateway, and a DNS server address. At operation 342, the migration VM 220b checks to see if there are more target NICs that need to receive new static IP addresses. If there are more target NICs that need to receive new static IP addresses, which would be the case for migrating multiple VMs, then at operation 344, go to the next NIC, and repeat operation 310.

Some NICs are not configured by DHCP. Therefore, in response to operation 310, at operation 330, the migration VM 220b sends an address resolution protocol (ARP) request for a source IP gateway to the target NIC. At operation 340, the migration VM 220b determines if the target NIC responds to the ARP request within a certain period of time. If it does not, at operation 334, go to a next source NIC, and repeat operation 330. If it does, at operation 340, apply the IP configuration of the source NIC to the target NIC. If there are more target NICs that need to receive new static IP addresses, then at operation 344, go to the next NIC, and repeat operation 310. In some embodiments, some of the target NICs are configured by DHCP, but some of the other target NICs are not configured by DHCP.

Figure 4:
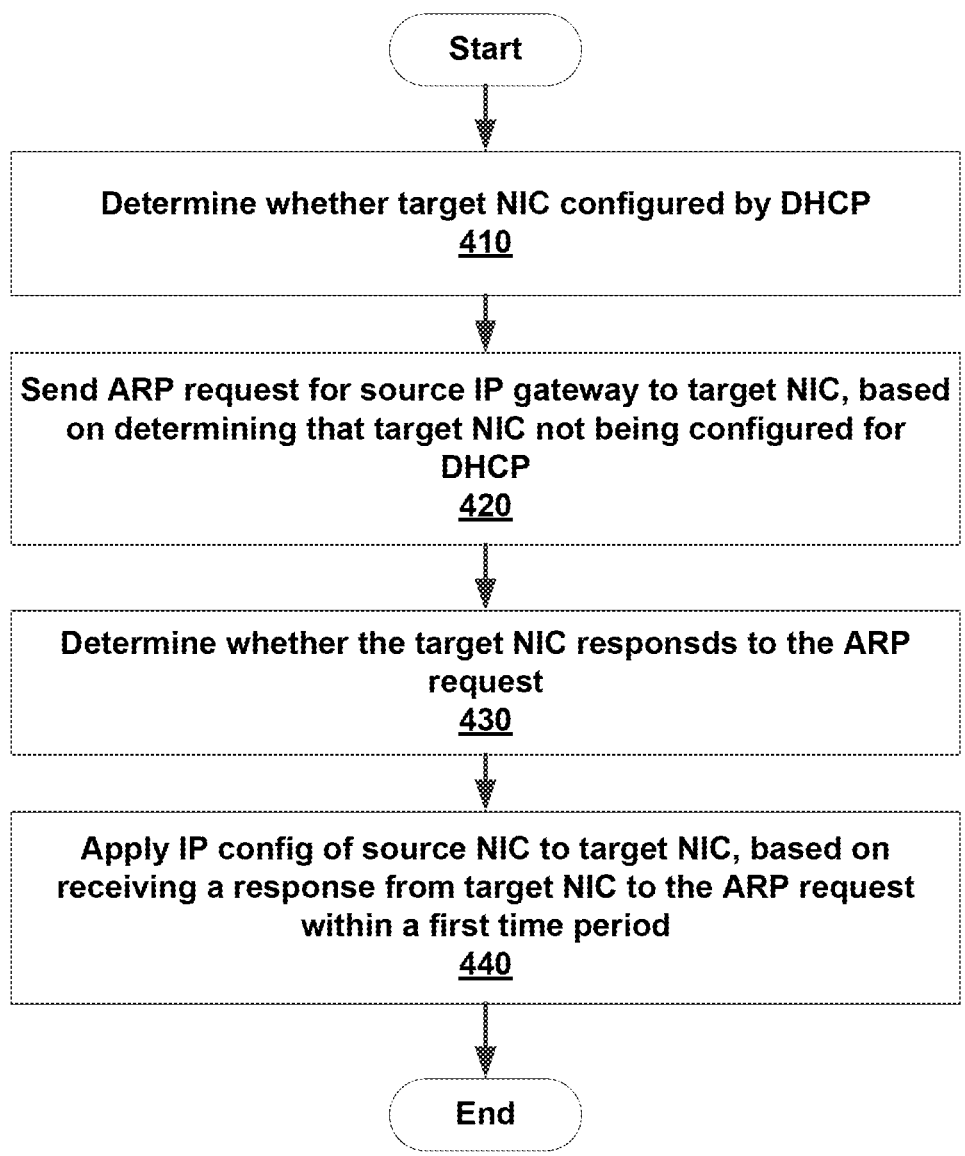
FIG. 4 illustrates an example method of mapping, by a migration virtual machine, multiple physical NICs on source host to multiple physical NICs on target host during a virtual machine migration across different hardware platforms according to some illustrative embodiments.

FIG. 4 illustrates an example method of mapping, by a migration virtual machine, multiple physical NICs on source host to multiple physical NICs on target host during a virtual machine migration across different hardware platforms. Additional, fewer, or different operations may be performed depending on the implementation. At operation 410, the migration virtual machine 220b determines whether a first target network interface card is configured by dynamic host configuration protocol. At operation 420, the migration virtual machine 220b sends a first address resolution protocol request for a first source Internet Protocol gateway to the first target network interface card, based on determining that the first target network interface card is not configured by dynamic host configuration protocol. At operation 430, the migration virtual machine 220b determines whether the first target network interface card responds to the first address resolution protocol request of the migration virtual machine 220b. At operation 440, the migration virtual machine 220b applies an Internet Protocol configuration of a first source network interface card to the first target network interface card, based on receiving the response from the first target network interface card to the first address resolution protocol request of the migration VM within a first time period.

Figure 5:
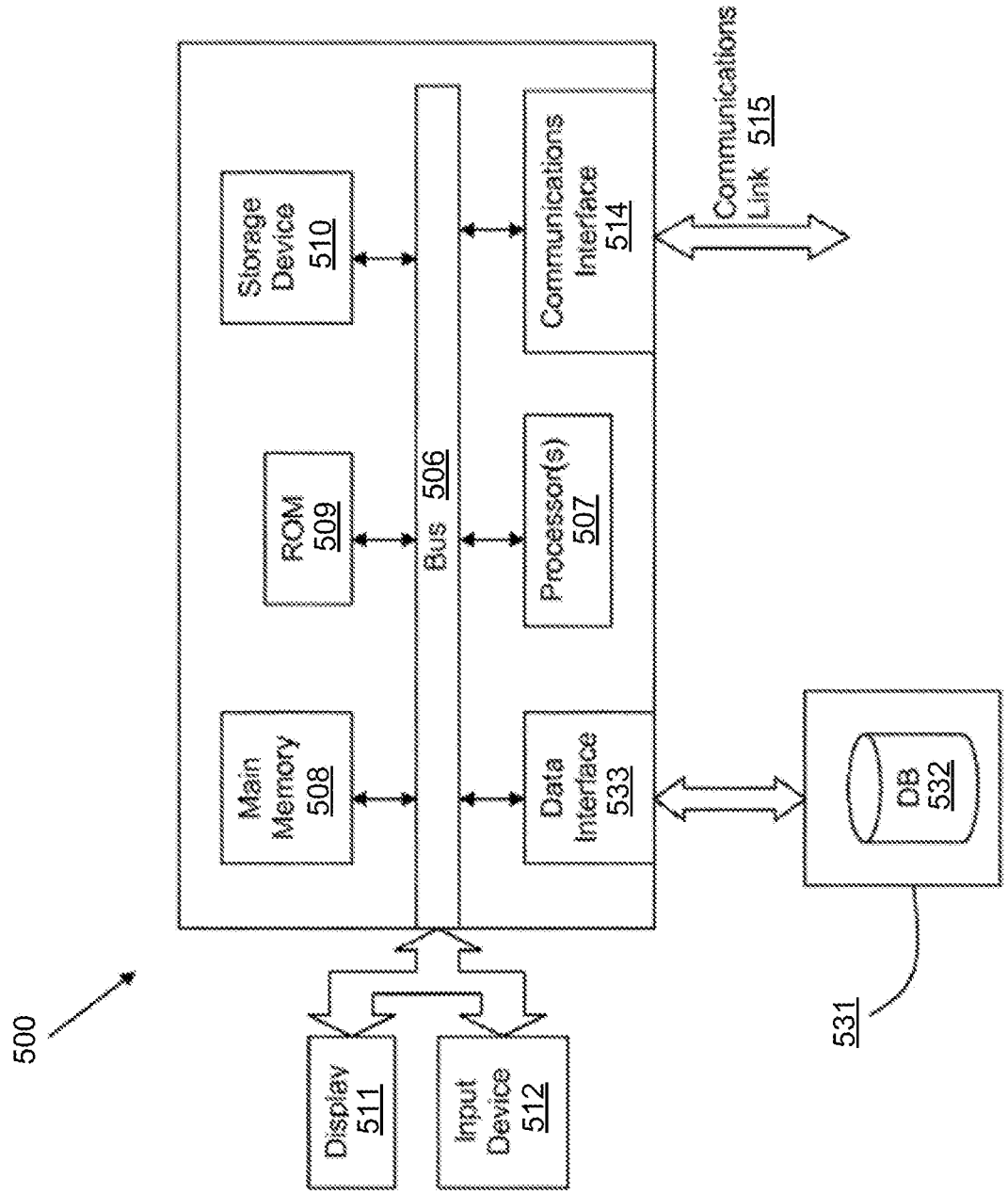
FIG. 5 illustrates a block diagram of a computing system suitable for implementing particular embodiments disclosed herein.

FIG. 5 illustrates a computer system 500 that includes a bus 506 (e.g., an address bus and a data bus) or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 511 (e.g., CRT, LCD, LED), input device 512 (e.g., keyboard, keypad, mouse, microphone). In particular embodiments, computer system 500 may include one or more of any such components.

According to one embodiment of the disclosure, computer system 500 performs specific operations by processor 507 executing one or more sequences of one or more instructions contained in system memory 508. Such instructions may be read into system memory 508 from another computer readable/usable medium, such as static storage device 509 or disk drive 510. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware.

The term "computer readable medium" or "computer usable medium" as used herein refers to any medium that participates in providing instructions to processor 507 for execution. Such a medium may take many forms, including but not limited to, nonvolatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions is performed by a single computer system 500. According to other embodiments, two or more computer systems 500 coupled by communication link 515 (e.g., LAN, PTSN, or wireless network) may perform the sequence of instructions in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. A database 532 in a storage medium 531 may be used to store data accessible by the system 500 by way of data interface 533.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed:
1. A computer-implemented method, comprising:
matching, by a processor, a first identifier of a first network interface card (NIC) on a target host with a second identifier of a second NIC on a source host; and
applying, by the processor, a static Internet Protocol (IP) address of the second NIC on the source host to the first NIC on the target host,
responsive to determining that the first NIC on the target host is configured by dynamic host configuration protocol (DHCP):
obtaining, by the processor, the first identifier of the first NIC on the target host from a first dynamic IP configuration file corresponding to the target host; and
obtaining, by the processor, the second identifier of the second NIC on the source host from a second dynamic IP configuration file corresponding to the source host.
2. A computer-implemented method, comprising:
matching, by a processor, a first identifier of a first network interface card (NIC) on a target host with a second identifier of a second NIC on a source host, wherein matching includes:
sending, by the processor, a request to the first NIC on the target host for an IP gateway corresponding to the second NIC responsive to determining that the first NIC on the target host is not configured by the DHCP; and receiving, by the processor, a response to the request from the first NIC on the target host within a predetermined time period; and applying, by the processor, a static Internet Protocol (IP) address of the second NIC on the source host to the first NIC on the target host.

3. The method of claim 1, further comprising:

causing, by the processor, a DHCP server to assign a dynamic IP configuration to the first NIC, wherein the dynamic IP configuration comprises the first identifier; and causing, by the processor, the DHCP server to store the dynamic IP configuration in the first dynamic IP configuration file corresponding to the target host.

4. The method of claim 1, wherein the first NIC is one of a plurality of first NICs on the target host, and wherein the second NIC is one of a plurality of second NICs on the source host.

5. The method of claim 1, wherein the first NIC has at least one different characteristic of a plurality of characteristics than the second NIC, wherein the plurality of characteristics comprises a vendor, a type, and a PCI slot.

6. The method of claim 1, wherein the first identifier is a first subnet mask and the second identifier is a second subnet mask.

7. The method of claim 2, wherein the request is an address resolution protocol request.

8. An apparatus comprising a processor having programmed instructions to:

match a first identifier of a first network interface card (NIC) on a target host with a second identifier of a second NIC on a source host;

apply a static Internet Protocol (IP) address of the second NIC on the source host to the first NIC on the target host; and responsive to determining that the first NIC on the target host is configured by dynamic host configuration protocol (DHCP):

obtain the first identifier of the first NIC on the target host from a first dynamic IP configuration file corresponding to the target host; and obtain the second identifier of the second NIC on the source host from a second dynamic IP configuration file corresponding to the source host.

9. An apparatus comprising a processor having programmed instructions to:

match a first identifier of a first network interface card (NIC) on a target host with a second identifier of a second NIC on a source host, wherein matching comprises:

sending a request to the first NIC on the target host for an IP gateway corresponding to the second NIC responsive to determining that the first NIC on the target host is not configured by the DHCP; and receiving a response to the request from the first NIC on the target host within a pre-determined time period; and apply a static Internet Protocol (IP) address of the second NIC on the source host to the first NIC on the target host.

10. The apparatus of claim 8, wherein the processor further has programmed instructions to:

cause a DHCP server to assign a dynamic IP configuration to the first NIC, wherein the dynamic IP configuration comprises the first identifier; and cause the DHCP server to store the dynamic IP configuration in the first dynamic IP configuration file corresponding to the target host.

11. The apparatus of claim 8, wherein the first NIC is one of a plurality of first NICs on the target host, and wherein the second NIC is one of a plurality of second NICs on the source host.

12. The apparatus of claim 8, wherein the first NIC has at least one different characteristic of a plurality of characteristics than the second NIC, wherein the plurality of characteristics comprises a vendor, a type, and a PCI slot.

13. The apparatus of claim 8, wherein the first identifier is a first subnet mask and the second identifier is a second subnet mask.

14. The apparatus of claim 9, wherein the request is an address resolution protocol request.

15. A non-transitory computer-readable storage medium having instructions stored thereon that, upon execution by a processor, causes the processor to perform operations comprising:

matching a first identifier of a first network interface card (NIC) on a target host with a second identifier of a second NIC on a source host;

applying a static Internet Protocol (IP) address of the second NIC on the source host to the first NIC on the target host; and responsive to determining that the first NIC on the target host is configured by dynamic host configuration protocol (DHCP):

obtaining the first identifier of the first NIC on the target host from a first dynamic IP configuration file corresponding to the target host; and obtaining the second identifier of the second NIC on the source host from a second dynamic IP configuration file corresponding to the source host.

16. A non-transitory computer-readable storage medium having instructions stored thereon that, upon execution by a processor, causes the processor to perform operations comprising:

matching a first identifier of a first network interface card (NIC) on a target host with a second identifier of a second NIC on a source host, wherein matching includes:

sending a request to the first NIC on the target host for an IP gateway corresponding to the second NIC responsive to determining that the first NIC on the target host is not configured by the DHCP; and receiving a response to the request from the first NIC on the target host within a pre-determined time period; and applying a static Internet Protocol (IP) address of the second NIC on the source host to the first NIC on the target host.

17. The non-transitory computer-readable storage medium of claim 15, the operations further comprising:

causing a DHCP server to assign a dynamic IP configuration to the first NIC, wherein the dynamic IP configuration comprises the first identifier; and causing the DHCP server to store the dynamic IP configuration in the first dynamic IP configuration file corresponding to the target host.

18. The non-transitory computer-readable storage medium of claim 15, wherein the first NIC is one of a plurality of first NICs on the target host, and wherein the second NIC is one of a plurality of second NICs on the source host.

19. The non-transitory computer-readable storage medium of claim 15, wherein the first NIC has at least one different characteristic of a plurality of characteristics than the second NIC, wherein the plurality of characteristics comprises a vendor, a type, and a PCI slot.

20. The non-transitory computer-readable storage medium of claim 15, wherein the first identifier is a first subnet mask and the second identifier is a second subnet mask.

21. The non-transitory computer-readable storage medium of claim 16, wherein the request is an address resolution protocol request.

* * * * *